(12) United States Patent
Nishimura et al.

(10) Patent No.: US 11,661,912 B2
(45) Date of Patent: *May 30, 2023

(54) ENGINE

(71) Applicant: Yanmar Power Technology Co., Ltd., Osaka (JP)

(72) Inventors: Katsuhiro Nishimura, Osaka (JP); Koichi Hirose, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/840,637

(22) Filed: Jun. 15, 2022

(65) Prior Publication Data

US 2022/0307453 A1 Sep. 29, 2022

Related U.S. Application Data

(63) Continuation of application No. 17/347,464, filed on Jun. 14, 2021, now Pat. No. 11,391,254, which is a (Continued)

(30) Foreign Application Priority Data

Jul. 14, 2016 (JP) ................. 2016-139446

(51) Int. Cl.
| | |
|---|---|
| F02M 37/32 | (2019.01) |
| F02M 21/02 | (2006.01) |
| F02D 19/08 | (2006.01) |
| F02D 19/06 | (2006.01) |
| F02M 37/00 | (2006.01) |
| F02M 37/38 | (2019.01) |
| F02M 37/22 | (2019.01) |

(52) U.S. Cl.
CPC ............. *F02M 37/32* (2019.01); *F02D 19/06* (2013.01); *F02D 19/0665* (2013.01); *F02D 19/0668* (2013.01); *F02D 19/08* (2013.01); *F02M 21/02* (2013.01); *F02M 37/00* (2013.01); *F02M 37/0064* (2013.01); *F02M 37/0088* (2013.01); *F02M 37/22* (2013.01); *F02M 37/38* (2019.01); *Y02T 10/12* (2013.01); *Y02T 10/30* (2013.01)

(58) Field of Classification Search
CPC ........ F02M 37/32; F02M 37/22; F02M 37/38; F02M 37/00; F02M 37/0064; F02M 37/0088; F02M 21/02; F02D 19/06; F02D 19/0665; F02D 19/0668; F02D 19/08; Y02T 10/12; Y02T 10/30
USPC ............ 123/525, 27 GE, 456, 457, 510, 511
See application file for complete search history.

(56) References Cited

U.S. PATENT DOCUMENTS

| | | | |
|---|---|---|---|
| 7,036,482 B2 * | 5/2006 | Beck ................... | F02D 41/0027 123/305 |
| 7,406,955 B1 * | 8/2008 | Gachik .............. | F02M 37/0064 123/1 A |
| 8,166,956 B2 * | 5/2012 | Ulrey ................... | F02D 19/081 123/525 |

* cited by examiner

*Primary Examiner* — Hai H Huynh
(74) *Attorney, Agent, or Firm* — Chris Mizumoto

(57) ABSTRACT

An engine operable in a premixed combustion system and a diffusion combustion system. The engine includes a main fuel injection valve, a pilot fuel injection valve, a liquid fuel tank, a main fuel supply path, a pilot fuel supply path, a pilot fuel filter, a pilot fuel high-pressure pump, a pilot fuel tank, and a pilot fuel supply pump. The pilot fuel tank stores pilot fuel sent from the pilot fuel high-pressure pump and not injected by the pilot fuel injection valve. This pilot fuel is sent to an automatic backwash filter and a pilot fuel filter while not passing through the liquid fuel tank.

3 Claims, 11 Drawing Sheets

Related U.S. Application Data continuation of application No. 16/892,224, filed on Jun. 3, 2020, now Pat. No. 11,060,491, which is a continuation of application No. 16/316,791, filed as application No. PCT/JP2017/022728 on Jun. 20, 2017, now Pat. No. 10,718,278.

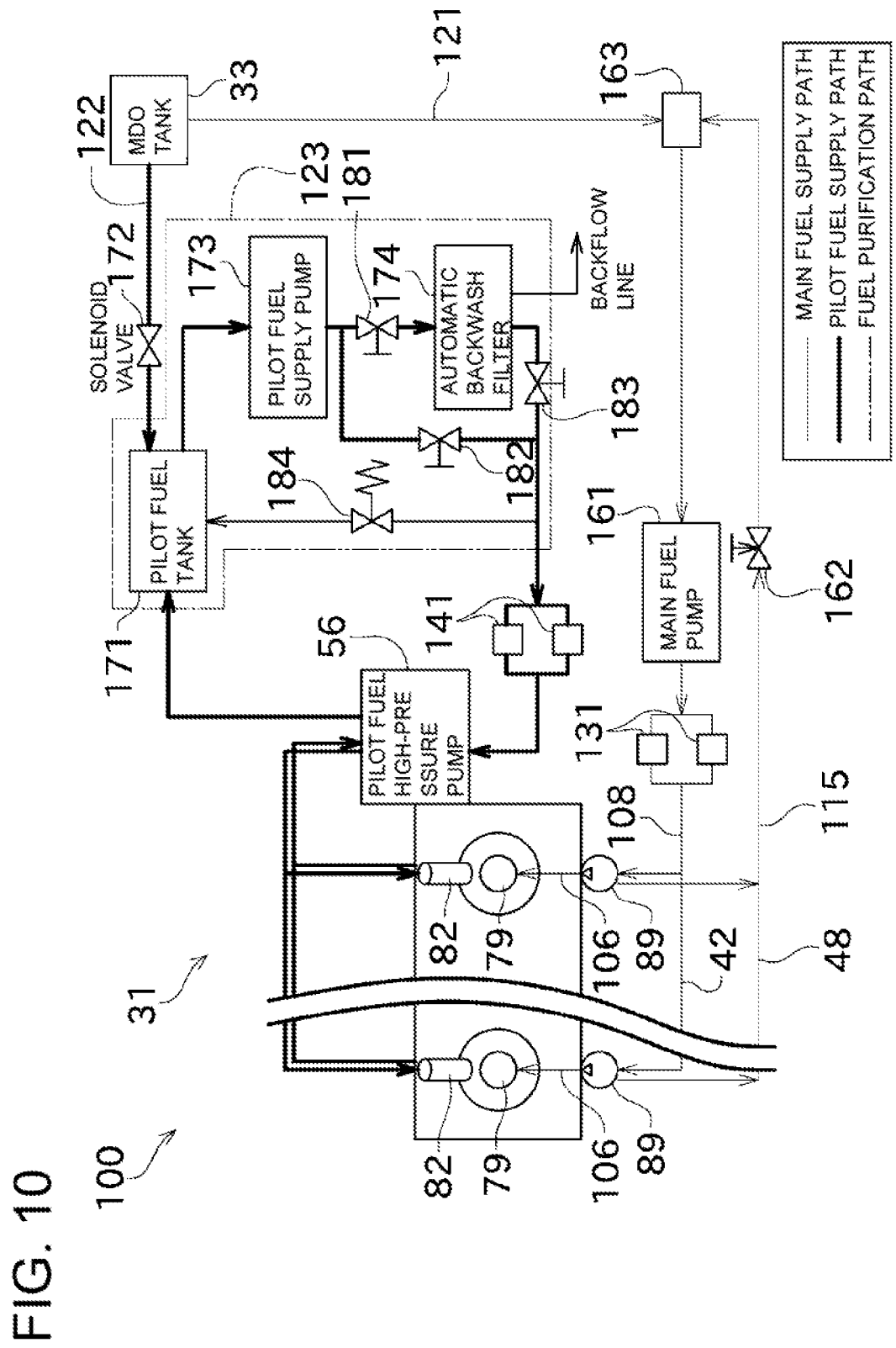

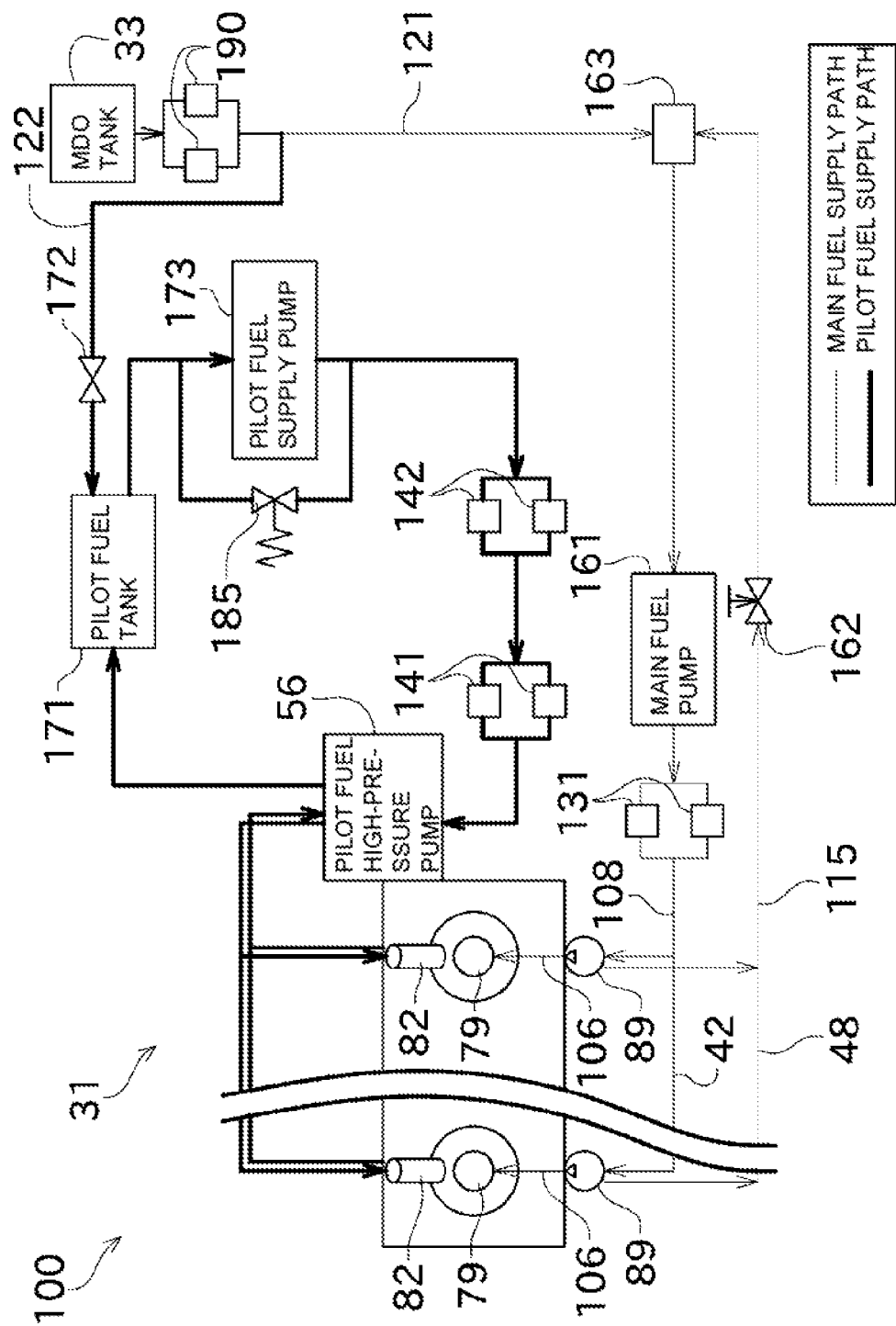

ENGINE

CROSS-REFERENCE

This is a continuation of US patent application, application Ser. No. 17/347,464, filed Jun. 14, 2021, which is a continuation of application Ser. No. 16/892,224, filed Jun. 3, 2020, which is a continuation of application Ser. No. 16/316,791, with the § 371 (1), (2) date of Jan. 10, 2019, which is a national phase entry of PCT/JP2017/022728 filed on Jun. 20, 2017, which claims priority to Japanese Patent Application, JP2016-139446, fled on Jul. 14, 2016. The documents cited herein are all incorporated by reference in their entirety.

TECHNICAL FIELD

The present invention relates to an engine employing multiple types of fuel.

BACKGROUND ART

A known so-called dual fuel engine is capable of being driven while selecting one of a premixed combustion system in which fuel gas such as natural gas is mixed with air for combustion and a diffusion combustion system in which liquid fuel (fuel oil) such as heavy oil is diffused for combustion. Patent Literature 1 (PTL 1) discloses a dual fuel engine.

The dual fuel engine of PTL 1 includes a fuel injection valve that supplies fuel to combustion chambers during combustion in the diffusion combustion system and supplies fuel to the combustion chambers in order to ignite gaseous fuel during combustion in the premixed combustion system.

CITATION LIST

Patent Literature

PTL 1: Japanese Patent Application Laid-Open No. 2002-4899

SUMMARY OF INVENTION

Technical Problem

In PTL 1, fuel is injected from the same fuel injection valve in both the diffusion combustion system and the premixed combustion system. However, the diffusion combustion system and the premixed combustion system have different purposes of fuel injection, and thus, cannot achieve optimum fuel injection in some cases when employing the same fuel injection valve.

In view of this, a configuration using different fuel injection valves between the diffusion combustion system and the premixed combustion system has been proposed. An engine of this type uses two types of fuel injection valves, and thus, needs two types of fuel supply paths. For the engine of this type, however, no specific fuel paths designed in consideration of fuel purification have been disclosed to date.

Some aspects of the present invention have been made in view of the foregoing circumstances, and have an object of providing a fuel path designed in consideration of fuel purification in an engine using different fuel injection devices between a diffusion combustion system and a premixed combustion system.

Solution to Problem and Advantages

Problems to be solved by the invention are as described above, and next, means for solving the problems and advantages thereof will be described.

In an aspect of the invention, an engine having the following configuration is provided.

That is, the engine is operable in a premixed combustion system in which gaseous fuel mixed with air is caused to flow into a combustion chamber and a diffusion combustion system that injects liquid fuel into the combustion chamber for combustion. The engine includes a main fuel injection valve, a pilot fuel injection valve, a liquid fuel tank, a main fuel supply path, a pilot fuel supply path, a pilot fuel filter, a pilot fuel high-pressure pump, a pilot fuel tank, and a pilot fuel supply pump. The main fuel injection valve supplies liquid fuel to the combustion chamber during combustion in the diffusion combustion system. The pilot fuel injection valve supplies liquid fuel as pilot fuel to the combustion chamber in order to ignite gaseous fuel during combustion in the premixed combustion system. The liquid fuel tank stores liquid fuel. The main fuel supply path supplies liquid fuel stored in the liquid fuel tank to the main fuel injection valve. The pilot fuel supply path supplies liquid fuel stored in the liquid fuel tank as pilot fuel to the pilot fuel injection valve. The pilot fuel filter is disposed in an intermediate portion of the pilot fuel supply path. The pilot fuel high-pressure pump is disposed in an intermediate portion of the pilot fuel supply path and sends, to the pilot fuel injection valve, pilot fuel that has passed through the pilot fuel filter. The pilot fuel tank is disposed in an intermediate portion of the pilot fuel supply path and stores pilot fuel sent from the pilot fuel high-pressure pump and not injected by the pilot fuel injection valve. The pilot fuel supply pump is disposed in an intermediate portion of the pilot fuel supply path and sends, to the pilot fuel filter, pilot fuel stored in the pilot fuel tank.

Accordingly, uninjected pilot fuel does not return to the liquid fuel tank and is supplied to the pilot fuel injection valve again. Thus, pilot fuel purified by the pilot fuel filter is not easily mixed with liquid fuel in the liquid fuel tank. Consequently, even with a low cleanliness of liquid fuel stored in the liquid fuel tank, the maintenance frequency of the pilot fuel filter can be reduced.

The engine preferably has the configuration as follows. Specifically, the engine includes a fuel purification path. The fuel purification path is a path for circulation through a purification filter for purifying pilot fuel and the pilot fuel tank.

Accordingly, pilot fuel is also purified by the purification filter, and thus, the maintenance frequency of the pilot fuel filter can be further reduced.

In the engine, the pilot fuel supply path and the fuel purification path preferably partially overlap each other.

Accordingly, since the two paths overlap, the length of fuel pipes can be reduced. In addition, a pressure loss occurring when fuel flows through the fuel pipes can be reduced.

In the engine, the purification filter is preferably an automatic backwash filter having a filtration efficiency lower than that of the pilot fuel filter.

Accordingly, the pilot fuel filter only needs to remove foreign substances not removed by the purification filter, and thus, the maintenance frequency of the pilot fuel filter can be further reduced.

The engine preferably has the configuration as follows. Specifically, the engine further includes a pilot fuel supply common rail pipe and a main fuel filter. The pilot fuel supply common rail pipe is disposed in an intermediate portion of the pilot fuel supply path, and supplies pilot fuel to the pilot fuel injection valve at a pressure higher than that a pressure at which liquid fuel is supplied to the main fuel injection valve. The main fuel filter is disposed in an intermediate portion of the main fuel supply path. The pilot fuel filter has a filtration efficiency higher than that of the main fuel filter.

Accordingly, clogging with pilot fuel injected at high pressure can be more efficiently prevented or reduced, and gaseous fuel can be ignited with reliability.

BRIEF DESCRIPTION OF DRAWINGS

FIG. 10 A schematic view for describing a fuel supply path that supplies fuel oil to the engine body FIG. 11 A schematic view for describing a fuel supply path that supplies fuel oil to an engine body according to a variation.

DESCRIPTION OF EMBODIMENTS

Figure 1:
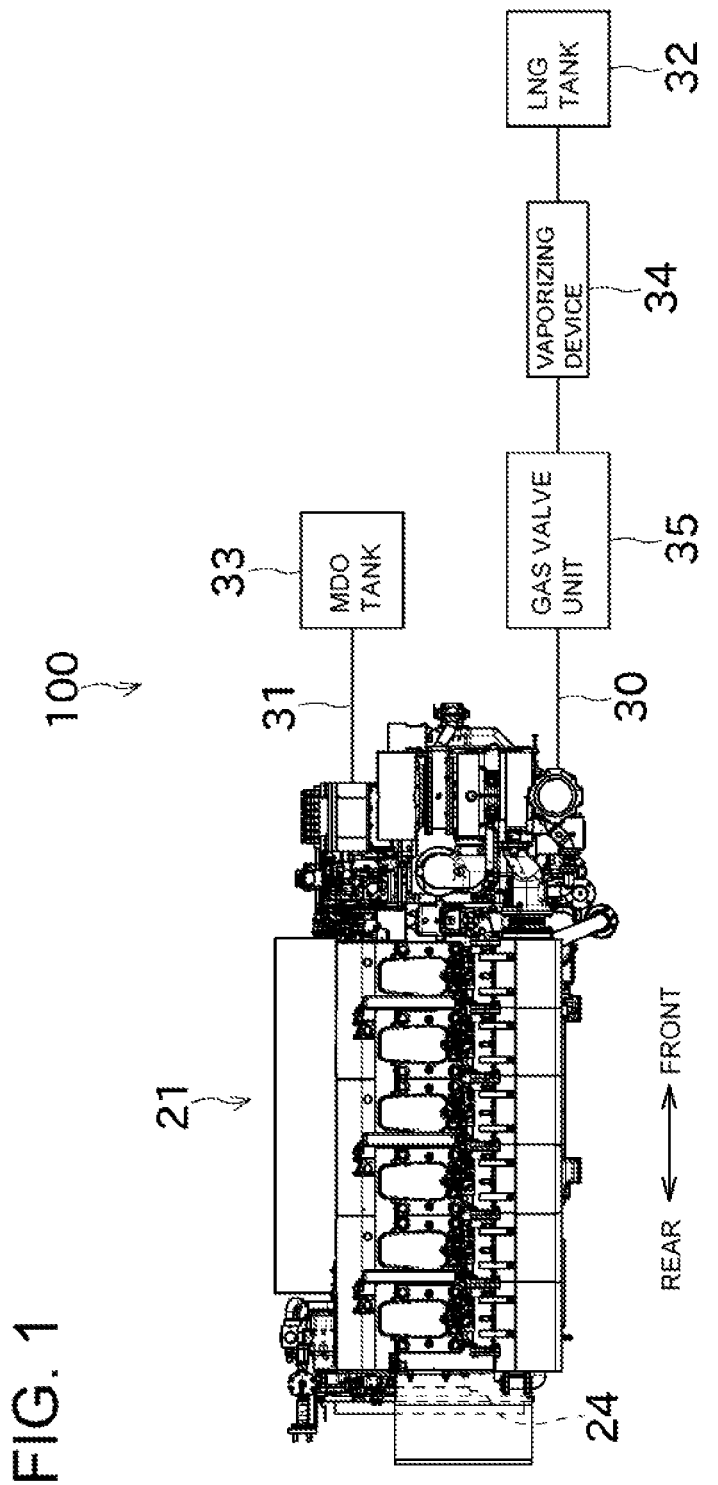
FIG. 1 A view schematically illustrating an engine according to one embodiment of the present invention.
Figure 2:
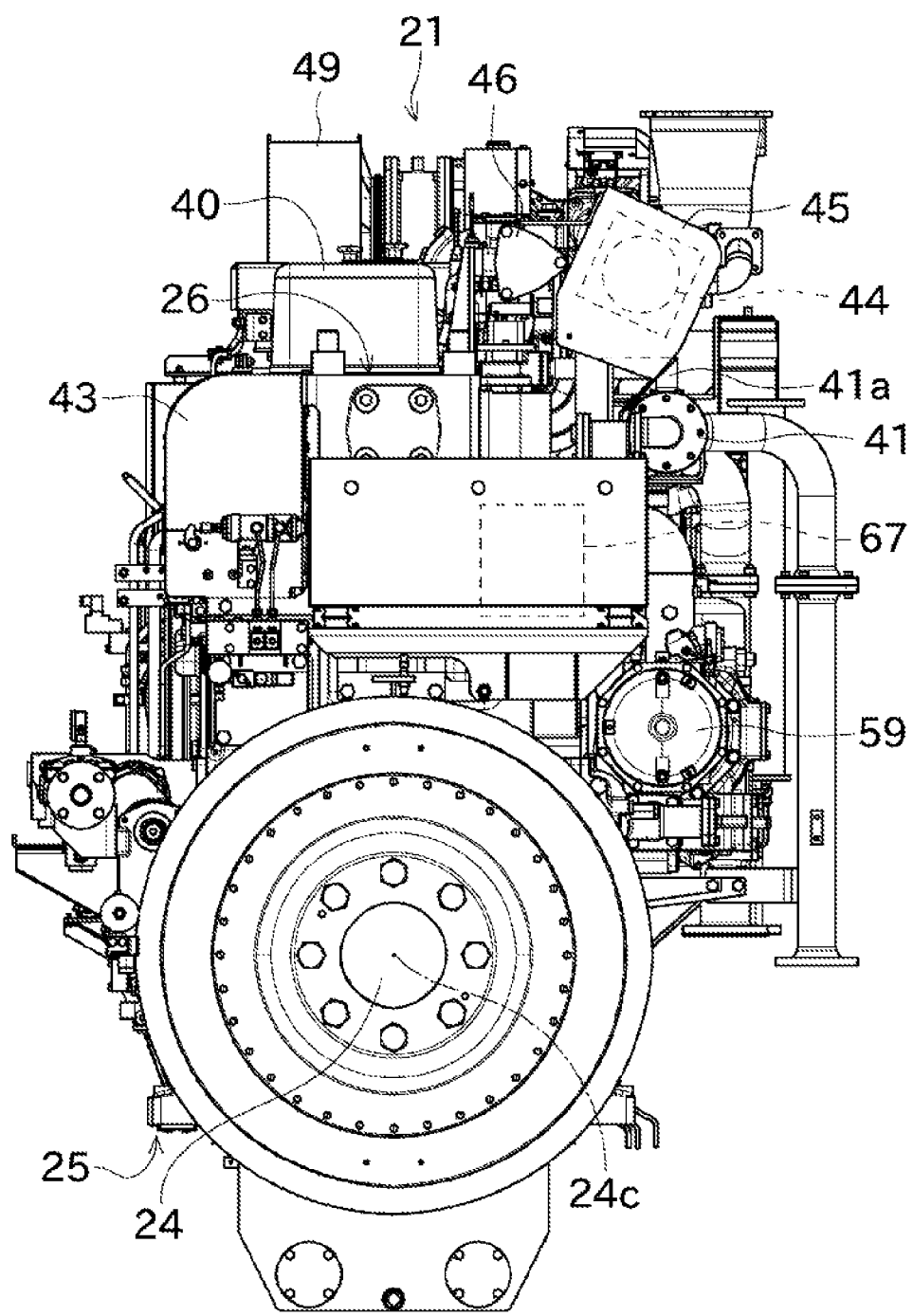
FIG. 2 A rear view of an engine body
Figure 3:
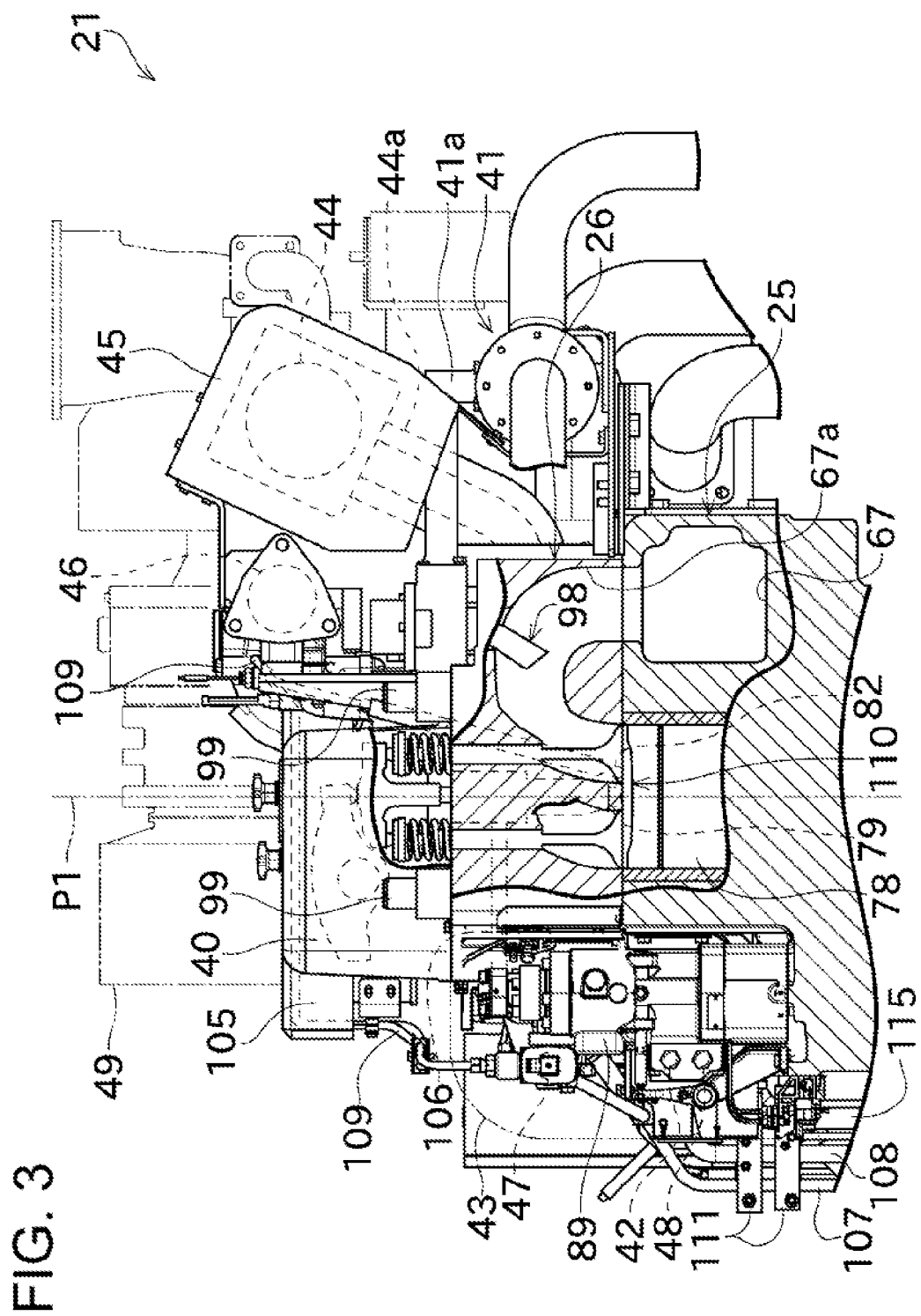
FIG. 3 A partial rear cross-sectional view illustrating a configuration around a combustion chamber in detail.
Figure 4:
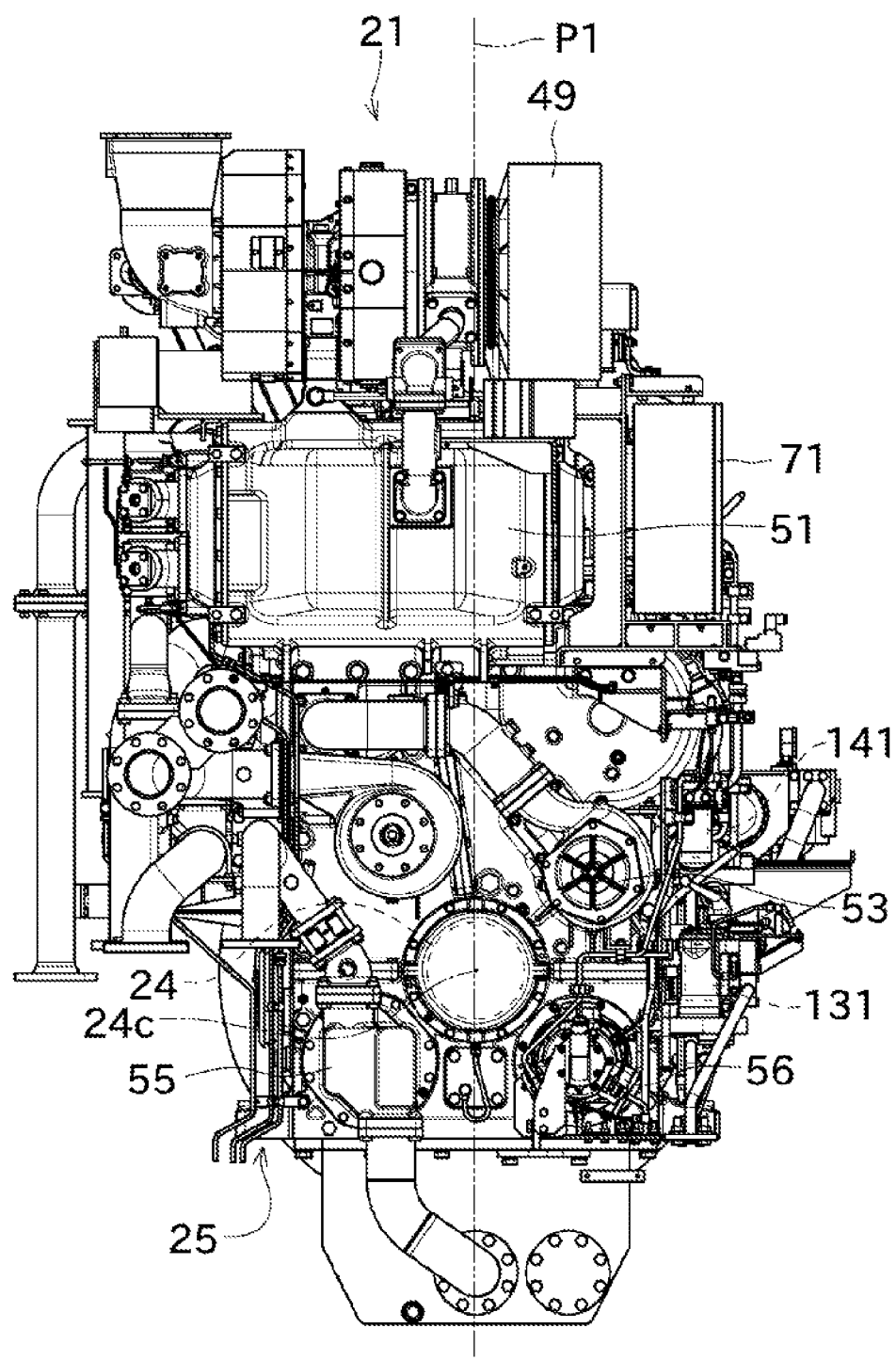
FIG. 4 A front view of the engine body.
Figure 5:
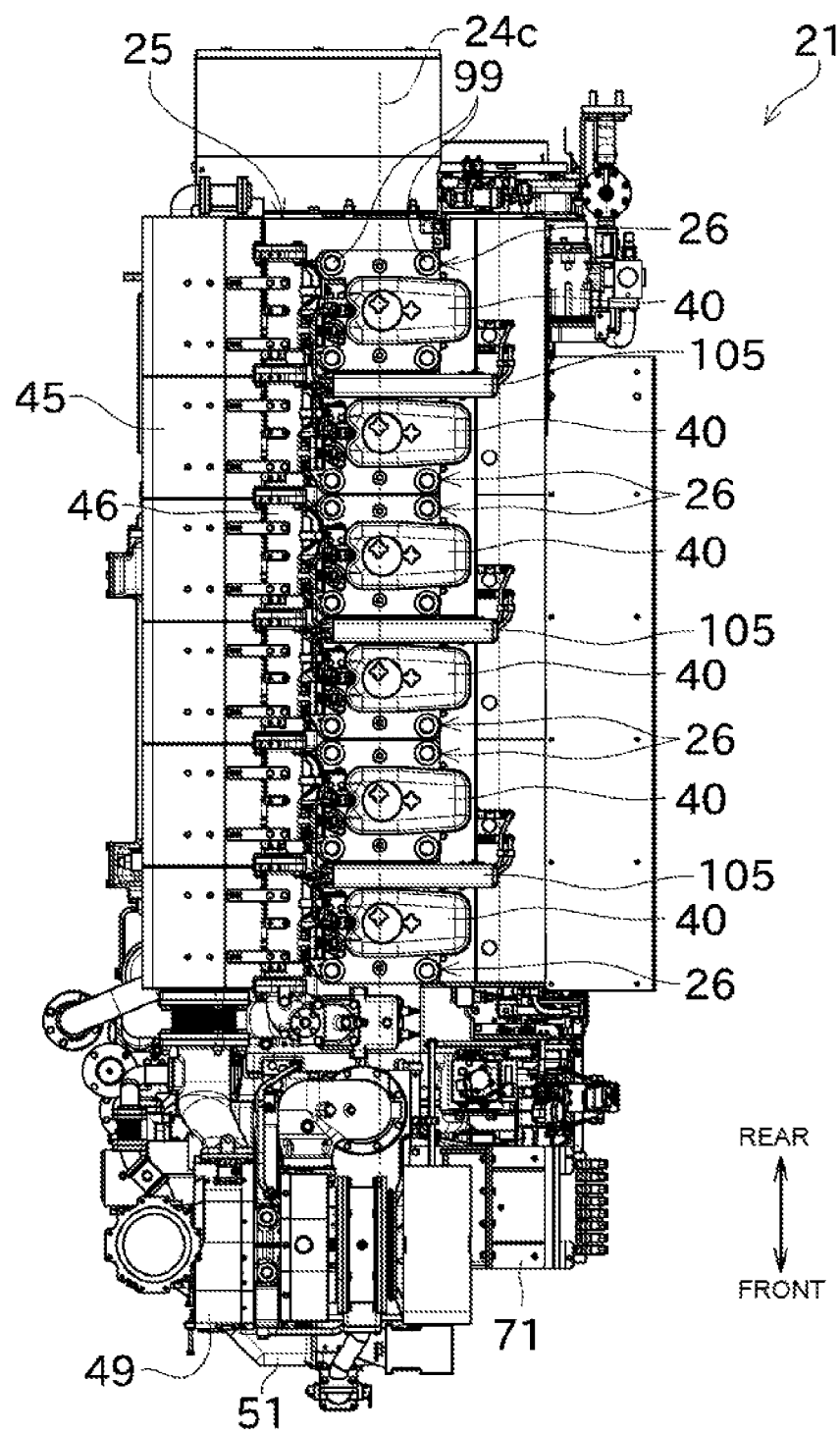
FIG. 5 A plan view of the engine body.
Figure 6:
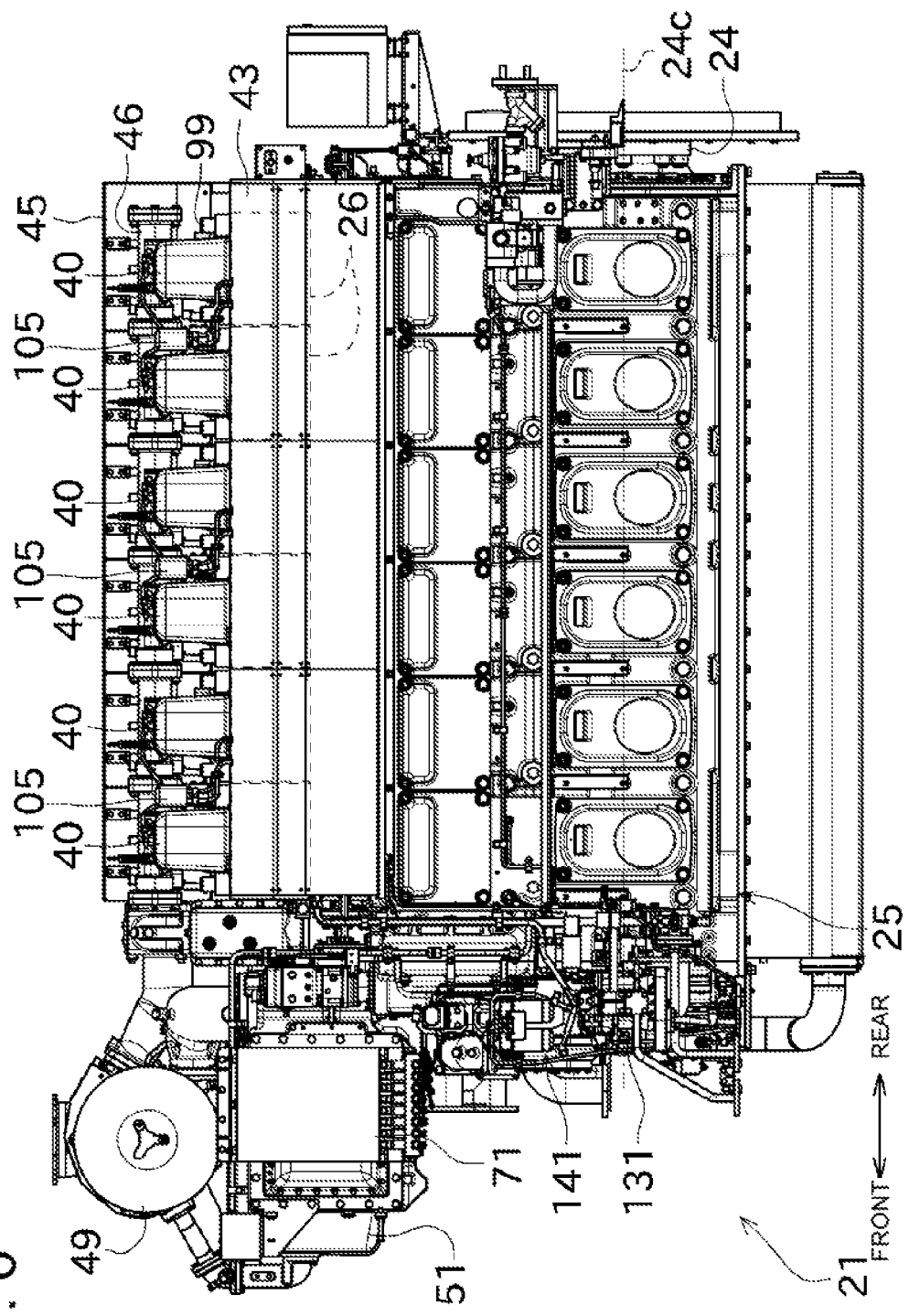
FIG. 6 A right side view of the engine body.
Figure 7:
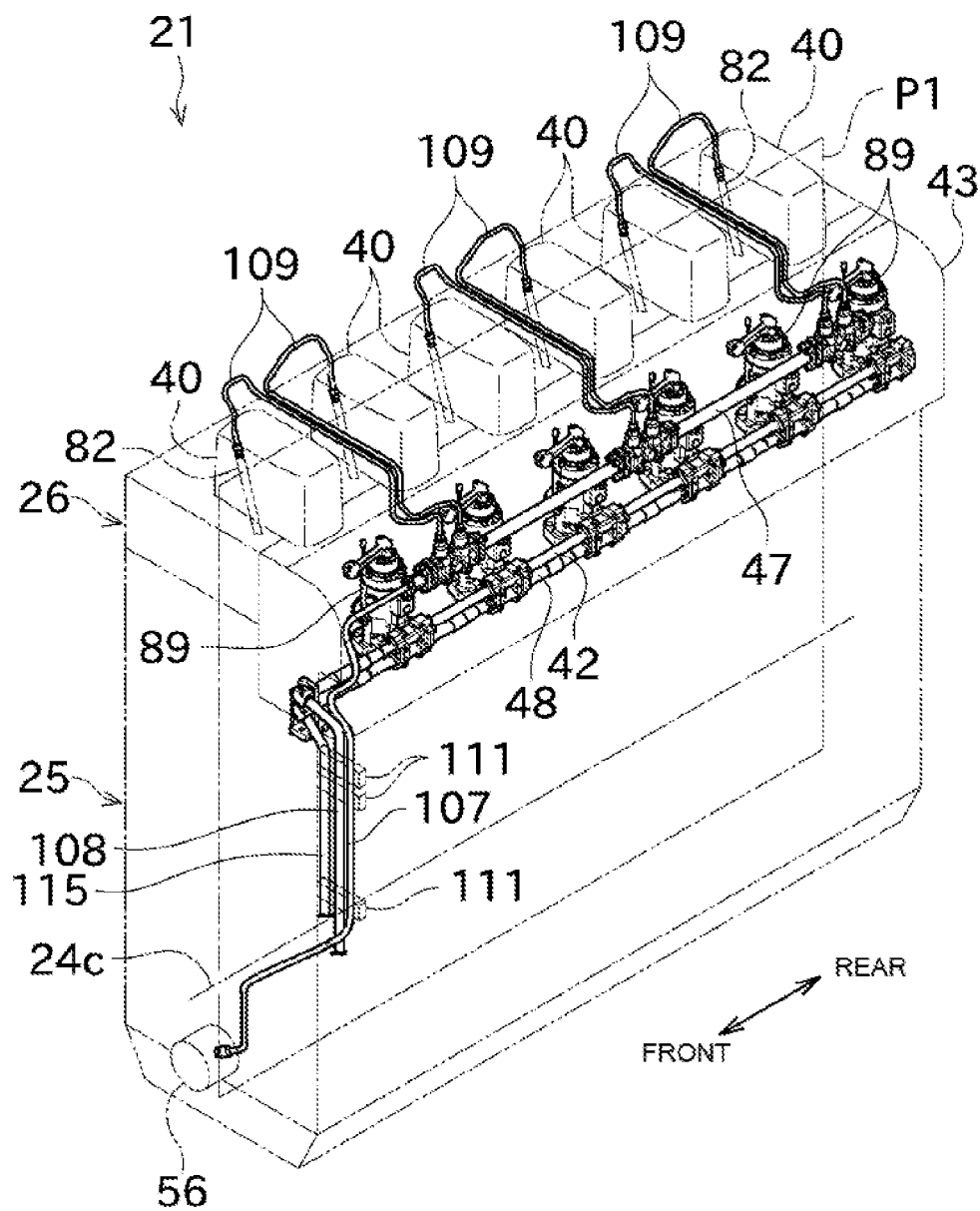
FIG. 7 A schematic front perspective view illustrating a liquid fuel supply path.
Figure 8:
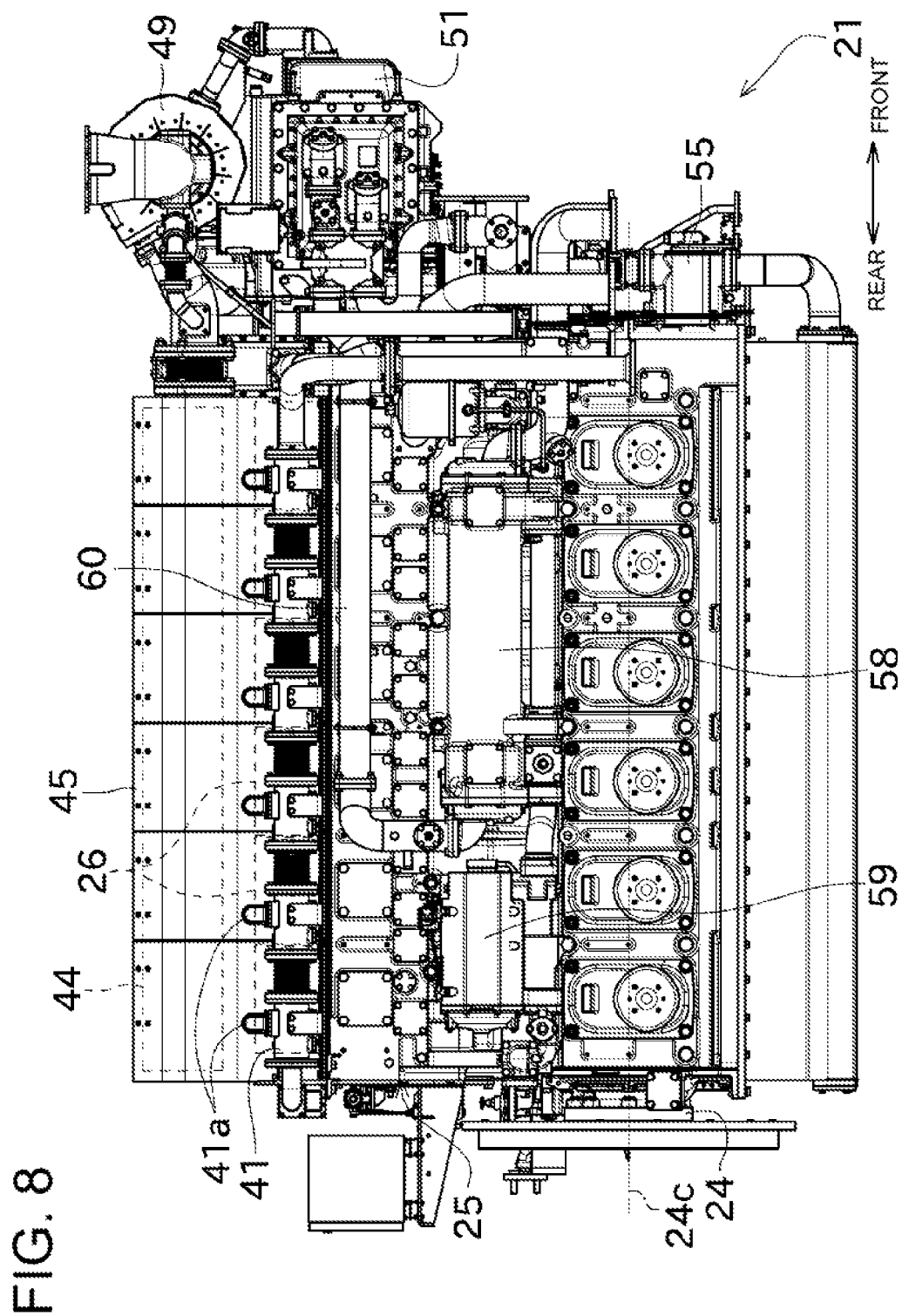
FIG. 8 A left side surface of the engine body.
Figure 9:
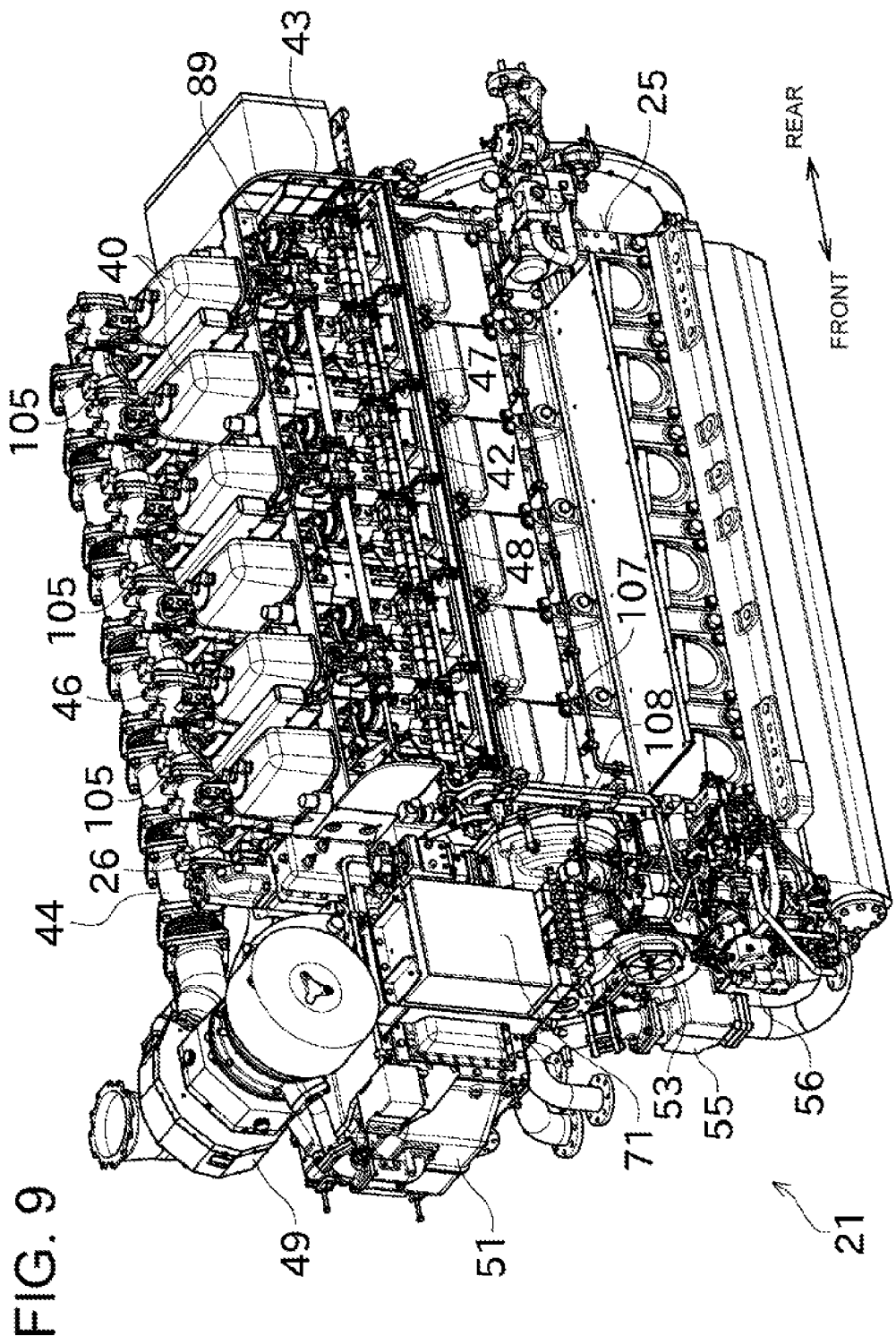
FIG. 9 A perspective view of the engine body illustrating a state where a part of a side cover and a heat shielding cover are detached.

An embodiment of the present invention will be described with reference to the drawings. FIG. 1 is a view schematically illustrating an engine 100 according to one embodiment of the present invention. FIG. 2 is a rear view of an engine body 21. FIG. 3 is a partial rear cross-sectional view illustrating a configuration around a combustion chamber 110 in detail. FIG. 4 is a front view of the engine body 21. FIG. 5 is a plan view of the engine body 21. FIG. 6 is a right side view of the engine body 21 FIG. 7 is a schematic front perspective view illustrating a liquid fuel supply path. FIG. 8 is a left side view of the engine body 21. FIG. 9 is a perspective view of the engine body 21 illustrating a state where a part of a side cover 43 and a heat shielding cover 45 are detached.

The engine 100 (engine with a fuel supply system) according to this embodiment illustrated in FIG. 1 is a so-called dual fuel engine operable in both a premixed combustion system in which gaseous fuel mixed with air is caused to flow into combustion chambers and a diffusion combustion system that injects liquid fuel into combustion chambers for combustion. The engine 100 according to this embodiment includes an engine body 21 that generates a driving force using supplied fuel. The engine body 21 serves as a driving source of a propulsive and power generating mechanism of an unillustrated ship and is mounted to an inner bottom plate of an engine room of the ship with a base interposed therebetween.

A crank shaft 24 serving as an engine output shaft projects rearward from a rear end of the engine body 21. An unillustrated speed-reducer is coupled to one end of the crank shaft 24 to enable power transfer. The speed reducer is sandwiched between the crank shaft 24 and an unillustrated propeller shaft of the ship, and the propeller shaft is disposed coaxially with the crank shaft 24. A propeller for generating propulsive power of the ship is attached to an end of the propeller shaft. The speed-reducer includes a PTO shaft, and an unillustrated shaft-driving power generator is coupled to the PTO shaft to enable power transfer.

This configuration enables a driving force of the engine body 21 to be branched into the propeller shaft and the shaft-driving power generator and transferred through the speed-reducer. Accordingly, propulsive power of the ship is generated, and electric power generated by driving the shaft-driving power generator is supplied to electric circuits in the ship.

Next, the engine 100 will be described in detail with reference to the drawings. The engine 100 is a dual fuel engine as described above, and can be driven while selecting one of a premixed combustion system in which fuel gas such as natural gas is mixed with the air for combustion and a diffusion combustion system in which liquid fuel (fuel oil) such as heavy oil is diffused for combustion.

Positional relationship will be described below with a side connected to the speed-reducer (a side where a flywheel is disposed) being defined as rear, the opposite side being defined as front of the engine body 21. In this positional relationship, left and right toward the front surface (front) of the engine body 21 are respectively defined as left and right of the engine body 21. Accordingly, the front-rear direction (longitudinal direction) can be a direction parallel to the axis of the crank shaft 24, and the left-right direction (lateral direction) can be a direction perpendicular to the axis of the crank shaft 24. It should be noted that this description is not intended to limit the orientation of the engine body 21, and the engine body 21 can be placed in various orientations in accordance with application and others.

As illustrated in FIG. 1, a gaseous fuel supply path 30 and a liquid fuel supply path 31 are connected to the engine body 21. A gaseous fuel tank 32 for storing liquefied natural gas (LNG) is connected to the gaseous fuel supply path 30, whereas a liquid fuel tank 33 for storing marine diesel oil (MDO) is connected to the liquid fuel supply path 31. In this configuration, the gaseous fuel supply path 30 supplies fuel gas to the engine body 21, and the liquid fuel supply path 31 supplies fuel oil to the engine body 21.

In the gaseous fuel supply path 30, a gaseous fuel tank 32 that stores gaseous fuel in a liquefied state, a vaporizing device 34 that vaporizes the liquefied fuel in the gaseous fuel tank 32, and a gas valve unit 35 that adjusts the supply rate of fuel gas from the vaporizing device 34 to the engine body 21, are arranged in this order from the upstream side.

As illustrated in FIGS. 2 through 4, the engine body 21 is an in-line multi-cylinder engine configured by mounting cylinder heads 26 onto a cylinder block 25. The crank shaft 24 is rotatably supported on a lower portion of the cylinder block 25 with an axis 24c oriented in the front-rear direction as illustrated in FIGS. 2 and 4.

In the cylinder block 25, a plurality of (six in this embodiment) cylinders are arranged in a line (in series) along the axis of the crank shaft 24. As illustrated in FIG. 3, each cylinder houses a piston 78 such that the pistons 78 are slidable in the top-bottom direction. This piston 78 is coupled to the crank shaft 24 through an unillustrated rod.

As illustrated in FIGS. 5 and 6, the plurality of (six in this embodiment) cylinder heads 26 are attached to the cylinder block 25 to cover the cylinders individually from above. The cylinder heads 26 are provided to the individual cylinders, and are fixed to the cylinder block 25 using head bolts 99.

As illustrated in FIG. 3, in each cylinder, the combustion chamber 110 is defined in space surrounded by the upper surface of the piston 78 and the cylinder head 26.

As illustrated in FIG. 5, a plurality of head covers 40 correspond to the individual cylinders and are arranged on the cylinder heads 26 in a line along the direction of the axis 24c of the crank shaft 24 (front-rear direction). As illustrated in FIG. 3, each of the head covers 40 houses a valve mechanism constituted by a push rod, a rocker arm, and so forth in order to operate an intake valve and an exhaust valve. In a state where the intake valves are open, intake air from an intake manifold 67 can be taken in the combustion chambers 110. In a state where the exhaust valves are open, exhaust air from the combustion chambers 110 can be emitted to an exhaust manifold 44.

As illustrated in FIG. 3, the upper end of a pilot fuel injection valve 82 described later is disposed near the left of each head cover 40. With respect to an imaginary vertical plane P1 (see FIG. 7) including the axis 24c of the crank shaft 24, the pilot fuel injection valves 82 are inserted in the cylinder heads 26 from one side (from the left in this embodiment) of the imaginary vertical plane P1 and extend obliquely downward toward the combustion chambers 110.

In the following description, a location at one side/the other side of the imaginary vertical plane P1 including the axis 24c of the crank shaft 24 will be sometimes referred to as a location at one side/the other side of the crank shaft 24. The imaginary vertical plane P1 can be an infinite plane in both the direction of the axis 24c of the crank shaft 24 and the top-bottom direction, but FIG. 7 shows only a part of the imaginary vertical plane P1 near the engine body 21 for convenience of expression in the perspective view.

As illustrated in FIGS. 2, 3, 8, a gas manifold 41 for distributing and supplying gaseous fuel to the combustion chambers 110 of the cylinders during combustion in the premixed combustion system is provided at the left of the cylinder heads 26. The gas manifold 41 extends in the front-rear direction along the left side surfaces of the cylinder heads 26. The plurality of (six in this embodiment) gas branch pipes 41a corresponding to the combustion chambers 110 of the cylinders are connected to the gas manifold 41, and as illustrated in FIG. 3, gas injectors 98 for injecting gaseous fuel are provided at the front ends of the gas branch pipes 41a. The front ends of the gas injectors 98 face intake branch pipes 67 a corresponding to the cylinders and formed inside the cylinder heads 26. By injecting gaseous fuel from the gas injectors 98, the gaseous fuel can be supplied to the intake branch pipes 67 a of the intake manifold 67.

As illustrated in FIGS. 3, 7, and 9, a liquid fuel supply rail pipe 42 for distributing and supplying liquid fuel to the combustion chambers 110 of the cylinders during combustion in the diffusion combustion system is disposed at the right of the cylinder block 25. The liquid fuel supply rail pipe 42 extends in the front-rear direction along the right side surface of the cylinder block 25. Liquid fuel supplied to the liquid fuel supply rail pipe 42 is distributed and supplied to main fuel injection pumps 89 corresponding to the cylinders. As illustrated in FIG. 3, each cylinder is provided with a main fuel injection valve 79 that injects liquid fuel supplied from the main fuel injection pump 89. The main fuel injection valves 79 are inserted in the cylinder heads 26 vertically from above the cylinder heads 26, the upper ends of the main fuel injection valves 79 are disposed inside the head covers 40, and the lower ends of the main fuel injection valves 79 face the combustion chambers 110 of the cylinders. The main fuel injection pumps 89 and the main fuel injection valves 79 are connected to each other through liquid fuel supply paths 106 formed in the cylinder heads 26.

A liquid fuel return aggregate pipe 48 for collecting redundant fuel returned from the main fuel injection pumps 89 is disposed near the bottom of the liquid fuel supply rail pipe 42. The liquid fuel return aggregate pipe 48 is disposed in parallel with the liquid fuel supply rail pipe 42, and connected to the main fuel injection pumps 89. A fuel return pipe 115 for returning liquid fuel to the liquid fuel tank 33 is connected to an end of the liquid fuel return aggregate pipe 48.

As illustrated in FIGS. 3, 7 and 9, a pilot fuel supply rail pipe (pilot fuel supply common rail pipe) 47 for distributing and supplying pilot fuel to the combustion chambers 110 of the cylinders in order to ignite gaseous fuel during combustion in the premixed combustion system is disposed at the right of the cylinder block 25 and above the liquid fuel supply rail pipe 42. The pilot fuel supply rail pipe 47 extends in the front-rear direction along the right side surface of the cylinder block 25. As illustrated in FIGS. 3 and 7, the cylinders are provided with the pilot fuel injection valves 82 for injecting liquid fuel (pilot fuel) supplied from the pilot fuel supply rail pipe 47. The pilot fuel injection valves 82 are inserted in the cylinder heads 26 vertically from above the cylinder heads 26, the upper ends of the pilot fuel injection valves 82 are disposed immediately at the left side of the head covers 40, and the lower ends of the pilot fuel injection valves 82 face the combustion chambers 110 of the cylinders. As illustrated in FIG. 7, pilot fuel branch pipes 109 corresponding to the cylinders branch off from the pilot fuel supply rail pipe 47. The pilot fuel branch pipes 109 pass between the head covers 40 arranged side by side, and are connected to the upper ends of the pilot fuel injection valves 82. The pilot fuel branch pipes 109 are covered with a branch pipe cover 105 for preventing leaked fuel from scattering.

As illustrated in FIGS. 3, 7, and 9, a step is formed on an upper portion of the right side surface of the engine body 21 constituted by the cylinder block 25 and the cylinder heads 26. The pilot fuel supply rail pipe 47, the liquid fuel supply rail pipe 42, and the main fuel injection pumps 89 are disposed on this step. A side cover 43 is attached to the cylinder block 25 and the cylinder heads 26 to cover the step. The pilot fuel supply rail pipe 47, the liquid fuel supply rail pipe 42, and the main fuel injection pumps 89 are covered with the side cover 43 FIG. 9 illustrates a state where a part of the side cover 43 is detached.

As illustrated in FIGS. 2, 3, and 9, the exhaust manifold 44 for collecting exhaust air generated by combustion in the combustion chambers 110 of the cylinders and emitting the exhaust air to the outside is disposed in parallel with the gas manifold 41 above the left of cylinder heads 26 and above the gas manifold 41. The outer periphery of the exhaust manifold 44 is covered with a heat shielding cover 45 (where the heat shielding cover 45 is detached in FIG. 9). As illustrated in FIG. 3, exhaust branch pipes 44 a corresponding to the cylinders are connected to the exhaust manifold 44. The exhaust branch pipes 44 a communicate with the combustion chambers 110 of the cylinders.

The intake manifold 67 for distributing and supplying outside air (intake air) to the combustion chambers 110 of the cylinders is disposed in parallel with the gas manifold 41 inside the cylinder block 25 and near the left of the cylinder block 25. As illustrated in FIG. 3, the six intake branch pipes 67 a branching off from the intake manifold 67 are formed inside the cylinder heads 26 and communicate with the individual combustion chambers 110.

With this configuration, in combustion in the diffusion combustion system, an appropriate amount of liquid fuel is injected from the main fuel injection valves 79 into the combustion chambers 110 at an appropriate timing when air supplied to the cylinders from the intake manifold 67 is compressed by sliding of the pistons 78. Injection of liquid fuel into the combustion chambers 110 causes the pistons 78 to reciprocate in the cylinders with propulsive power obtained by combustion in the combustion chambers 110, and the reciprocating movement of the pistons 78 is converted to rotation movement of the crank shaft 24 through a rod, thereby obtaining a driving force.

On the other hand, in combustion in the premixed combustion system, gaseous fuel from the gas manifold 41 is injected from the gas injectors 98 into the intake branch pipes 67 *a* so that air supplied from the intake manifold 67 and the gaseous fuel are mixed. At an appropriate timing when the air mixture of the air introduced into the cylinders and the gaseous fuel is compressed by sliding of the pistons 78, a small amount of pilot fuel is injected from the pilot fuel injection valves 82 into the combustion chambers 110 so that the gaseous fuel is ignited. The pistons 78 reciprocates in the cylinders with propulsive power obtained by combustion in the combustion chambers 110, and the reciprocating movement of the pistons 78 is converted to rotation movement of the crank shaft 24 through the rod, thereby obtaining a driving force.

In either case of combustion in the diffusion combustion system and combustion in the premixed combustion system, exhaust air generated by combustion is pushed out from the cylinders by movement of the pistons 78, and collected in the exhaust manifold 44, and then emitted to the outside.

As illustrated in FIG. 4, a cooling water pump 53, a lubricating oil pump 55, and a pilot fuel high-pressure pump 56 are disposed at the front end surface (front surface) of the engine body 21 and surround a front end portion of the crank shaft 24. The pilot fuel high-pressure pump 56 is disposed near the right of the crank shaft 24. A front end portion of the engine body 21 is provided with an unillustrated rotation transfer mechanism that transfers a rotative force of the crank shaft 24. Accordingly, a rotative force of the crank shaft 24 is transferred through the rotation transfer mechanism so that the cooling water pump 53, the lubricating oil pump 55, and the pilot fuel high-pressure pump 56 provided at the outer periphery of the crank shaft 24 are thereby driven.

As illustrated in FIG. 8, a lubricating oil cooler 58 and a lubricating oil strainer 59 are attached to the left side surface of the cylinder block 25. Lubricating oil supplied from the lubricating oil pump 55 is cooled by the lubricating oil cooler 58, then purified by the lubricating oil strainer 59, and supplied to components of the engine body 21.

Cooling water sent from the cooling water pump 53 illustrated in FIG. 4 cools cylinders of the engine body 21, and then is collected to an over-cylinder head cooling water pipe 46 illustrated in, for example, FIG. 5.

The intercooler 51 is disposed along the front end of the engine body 21, and cools air compressed by a compressor of the turbocharger 49. As illustrated in FIG. 8, a cylinder block left cooling water pipe 60 extends rearward from ahead of the cylinder block 25 along the gas manifold 41 to a position between the lubricating oil cooler 58 and the lubricating oil strainer 59, and supplies cooling water to the lubricating oil cooler 58.

As illustrated in FIGS. 5 and 9, the over cylinder head cooling water pipe 46 is disposed in parallel with the exhaust manifold 44 and located between a plurality of head covers 40 above the cylinder heads 26 and the exhaust manifold 44. The over cylinder head cooling water pipe 46 is coupled to cooling water branch pipes corresponding to the cylinders, and is connected to cooling water channel of the cylinders (cooling water channels formed in the cylinder heads 26) through the cooling water branch pipes.

The pilot fuel high-pressure pump 56 illustrated in FIG. 4 is driven to rotate to thereby increase the pressure of fuel oil (liquid fuel) supplied from the liquid fuel tank 33 illustrated in FIG. 1 by an unillustrated fuel feed pump, and sends the fuel oil to the pilot fuel supply rail pipe 47 by way of the pilot fuel supply main pipe 107 illustrated in, for example, FIG. 7. Pilot fuel filters 141 for filtering fuel oil are provided in an intermediate portion of a fuel path from the liquid fuel tank 33 to the pilot fuel high-pressure pump 56.

The unillustrated fuel feed pump (different from the pilot fuel high-pressure pump 56) is driven by a motor so that the fuel feed pump sucks fuel oil from the liquid fuel tank 33 and sends the oil to the liquid fuel supply rail pipe 42 by way of the liquid fuel supply main pipe 108 illustrated in, for example, FIG. 7. Main fuel filters 131 for filtering fuel oil are disposed in an intermediate portion of a supply path of fuel oil from the liquid fuel tank 33 to the liquid fuel supply rail pipe 42.

As illustrated in FIG. 7, the pilot fuel supply main pipe 107, the liquid fuel supply main pipe 108, and the fuel return pipe 115 are disposed immediately ahead of the cylinder block 25 and extend along the right side surface of the cylinder block 25. The pilot fuel supply main pipe 107, the liquid fuel supply main pipe 108, and the fuel return pipe 115 extend in the top-bottom direction along the right side surface of the cylinder block 25 through a plurality of clamp members 11I projecting rightward from the front end surface of the cylinder block 25.

An engine-side operation control device 71 for performing control such as start and stopping of the engine body 21 is disposed toward the right and ahead of the cylinder heads 26, more specifically, on the right side surface of the intercooler 51 with a stay interposed therebetween (see FIGS. 6 and 9). The engine-side operation control device 71 includes an operation section such as a switch that accepts start and stopping of the engine body 21 by an operator, and a display that displays an operating state of the engine body 21. The operator operates the engine-side operation control device 71 to thereby drive the engine body 21 in one of the premixed combustion system and the diffusion combustion system.

Next, configurations of the main fuel filters 131 and the pilot fuel filters 141 and a configuration around these filters will be more specifically described with reference to FIG. 10. FIG. 10 is a schematic view for describing the liquid fuel supply path 31 that supplies fuel oil to the engine body 21.

As illustrated in FIG. 10, in this embodiment, the liquid fuel supply path 31 that supplies fuel oil can be divided into two paths (specifically circulation paths) a main fuel supply path 121 that supplies fuel to the main fuel injection valves 79 and a pilot fuel supply path 122 that supplies fuel to the pilot fuel injection valves 82. The engine 100 includes a fuel purification path 123 for purifying fuel oil to be supplied to the pilot fuel injection valves 82.

In the main fuel supply path 121, a main fuel pump 161, the main fuel filters 131, main fuel injection pumps 89, main fuel injection valves 79, a main pressure retention valve 162, and an air separator 163 are arranged in this order from an upstream side in the flow direction of fuel oil.

Fuel oil (liquid fuel) in the liquid fuel tank 33 is sucked by the main fuel pump 161 disposed in the engine body 21.

Fuel oil emitted from the main fuel pump 161 is supplied to the main fuel injection valves 79 through the main fuel supply path 121. The main fuel supply path 121 includes, for example, the liquid fuel supply main pipe 108, the liquid fuel supply rail pipe 42, the liquid fuel supply paths 106, the liquid fuel return aggregate pipe 48, and the fuel return pipe 115 described above. As illustrated in FIG. 10, redundant fuel oil returned from the main fuel injection pumps 89 is returned to the air separator 163 by way of the liquid fuel return aggregate pipe 48 and the fuel return pipe 115. The air separator 163 removes air included in liquid fuel circulating in the main fuel supply path 121. The air separator 163 is disposed on the main fuel supply path 121 and at an intersection of a path toward the main fuel injection pumps 89 and a path from the main fuel injection pumps 89. Thus, liquid fuel returned from the main fuel injection pumps 89 and liquid fuel newly supplied from the liquid fuel tank 33 are combined together inside the air separator 163. Accordingly, the combined liquid fuel circulates in the main fuel supply path 121. The main pressure retention valve 162 for retaining the pressure of the returned fuel is disposed between the fuel return pipe 115 and the liquid fuel tank 33.

The main fuel filters 131 are disposed in an intermediate portion of the main fuel supply path 121 in order to remove foreign substances contained in liquid fuel. Specifically, the main fuel filters 131 filter liquid fuel yet to be supplied to the main fuel injection valves 79 and capture foreign substances, dirt, and the like contained in the liquid fuel on switching wash filters. As illustrated in FIG. 10, the main fuel filters 131 are provided as a pair such that while one of the main fuel filters is under maintenance, the other filter can be used. Accordingly, during driving of the engine body 21, the main fuel filters 131 can be consecutively used.

As illustrated in FIG. 10, in the pilot fuel supply path 122, a solenoid valve 172, a pilot fuel tank 171, a pilot fuel supply pump 173, maintenance valves 181 through 183, an automatic backwash filter (purification filter) 174, the pilot fuel filters 141, the pilot fuel high-pressure pump 56, and the pilot fuel injection valves 82 are arranged in this order from an upstream side in the flow of fuel oil.

The pilot fuel tank 171 stores liquid fuel (pilot fuel) to be supplied to the pilot fuel injection valves 82. The pilot fuel tank 171 is disposed separately from the liquid fuel tank 33.

The pilot fuel tank 171 and the liquid fuel tank 33 are connected to each other by an appropriate pipe. The pipe is provided with the solenoid valve 172. Fuel oil is supplied from the liquid fuel tank 33 to the pilot fuel tank 171 appropriately by opening and closing the solenoid valve 172 so that a constant amount or more of fuel oil in the pilot fuel tank 171 can be maintained.

The pilot fuel supply pump 173 is disposed downstream of the pilot fuel tank 171. The pilot fuel supply pump 173 is driven by an unillustrated electric motor to suck fuel oil in the pilot fuel tank 171 and emit the oil toward the automatic backwash filter 174. Fuel oil from which foreign substances have been removed by the automatic backwash filter 174 returns to the pilot fuel tank 171 by way of a pilot pressure retention valve 184 so that fuel oil can be continuously cleaned (the fuel purification path 123 described later). On the other hand, the pilot fuel supply path 122 includes a path that supplies fuel oil subjected to pressure control and cleaning to the pilot fuel high-pressure pump 56. In this configuration, fuel oil is continuously cleaned before supply to the pilot fuel high-pressure pump 56, and can be supplied at a pressure necessary for the pilot fuel high-pressure pump 56. The pilot fuel supply path 122 includes the pilot fuel supply main pipe 107, the pilot fuel supply rail pipe 47, and the pilot fuel branch pipes 109 described above. The pilot fuel high-pressure pump 56 described above is disposed in an intermediate portion of the pilot fuel supply path 122.

Each of the pilot fuel supply main pipe 107, the pilot fuel supply rail pipe 47, and the pilot fuel branch pipes 109 has a double-pipe structure, can supply fuel oil from the pilot fuel high-pressure pump 56 to the pilot fuel injection valves 82 and can also return fuel oil leaked from the pilot fuel injection valves 82 to the pilot fuel high-pressure pump 56. Fuel oil returned from the pilot fuel injection valves 82 to the pilot fuel high-pressure pump 56 and fuel oil redundant in the pilot fuel high-pressure pump 56 are returned to the pilot fuel tank 171 through appropriate pipes. The fuel oil returned to the pilot fuel tank 171 is not returned to the liquid fuel tank 33, and is sent to the automatic backwash filter 174 and the pilot fuel filters 141 by the pilot fuel supply pump 173. Thus, the pilot fuel tank 171 serves as a return tank. The fuel oil returned to the pilot fuel tank 171 may be partially returned to the liquid fuel tank 33.

Here, a path passing through the automatic backwash filter 174 and a path bypassing the automatic backwash filter 174 are formed between the pilot fuel supply pump 173 and the pilot fuel filters 141. In the path passing through the automatic backwash filter 174, the maintenance valve 181 and 183 are disposed upstream and downstream of the automatic backwash filter 174. In the path bypassing the automatic backwash filter 174, the maintenance valve 182 is disposed. With this configuration, when the maintenance valve 181 and the maintenance valve 183 are closed and the maintenance valve 182 is opened, no fuel flows in the automatic backwash filter 174, and thus, maintenance can be performed on the automatic backwash filter 174.

The pilot fuel filters 141 is disposed in an intermediate portion of the pilot fuel supply path 122 in order to remove foreign substances contained in liquid fuel supplied as pilot fuel. Specifically, the pilot fuel filters 141 filter liquid fuel yet to be supplied to the pilot fuel injection valves 82 and capture foreign substances, dirt, and the like contained in the liquid fuel on interchangeable paper filters. The pilot fuel filters 141 have a filtration efficiency higher than that of the automatic backwash filter 174 (e.g., has a smaller filter clearance, a smaller mesh; the same hereinafter). In this manner, foreign substances or the like not filtered by the automatic backwash filter 174 can be filtered by the pilot fuel filters 141. The filtration efficiency of the pilot fuel filters 141 may be equal to that of the automatic backwash filter 174, or may be lower than that of the automatic backwash filter 174. The pilot fuel filters 141 are provided as a pair such that while one of the pilot fuel filters is under maintenance, the other filter can be used. Accordingly, during driving of the engine body 21, the pilot fuel filters 141 can be consecutively used. As the paper filters of the pilot fuel filters 141, filters having a higher filtration efficiency than that of the switching wash filters of the main fuel filters 131 are used.

As described above, fuel oil to be supplied to the pilot fuel injection valves 82 circulates in a looped path including a looped path (fuel purification path 123) including the pilot fuel tank 171, the pilot fuel supply pump 173, the automatic backwash filter 174, and the pilot pressure retention valve 184, the pilot fuel filters 141, and the pilot fuel high-pressure pump 56. This path is substantially independent of a path for supplying fuel oil to the main fuel injection valves 79 of the main fuel supply path 121. Thus, while sharing the liquid fuel tank 33 as a source, filtration performance of the main fuel filters 131 and the pilot fuel filters 141 can be obtained independently of each other. With the circulation in the looped path described above, pilot fuel oil passes through the fine-mesh automatic backwash filter 174 and the fine-mesh pilot fuel filters 141 multiple times. Accordingly, considerably high cleanliness can be achieved for pilot fuel oil.

The engine 100 according to this embodiment includes the fuel purification path 123. The fuel purification path 123 is a circulation path for purifying fuel oil. Specifically, the fuel purification path 123 is a path connecting the pilot fuel tank 171, the pilot fuel supply pump 173, and the automatic backwash filter 174 together in a loop. Fuel oil sent from the pilot fuel tank 171 by the pilot fuel supply pump 173 is purified by the automatic backwash filter 174, and is partially returned to the pilot fuel tank 171 through the pilot pressure retention valve 184. This configuration can obtain higher cleanliness of pilot fuel oil.

The fuel purification path 123 overlaps the pilot fuel supply path 122 in a section indicated by bold lines in FIG. 10. Thus, as compared to a configuration in which the fuel purification path 123 is disposed not to overlap the main fuel supply path 121, the volumes of the pilot fuel tank 171, the pilot fuel supply pump 173, and the automatic backwash filter 174, for example, can be reduced.

In the engine 100 according to this embodiment, the main fuel filters 131 and the pilot fuel filters 141 are individually disposed. Thus, maintenance can be performed on the main fuel filters 131 or the pilot fuel filters 141 in accordance with frequency of use in each of the diffusion combustion system and the premixed combustion system. Consequently, the frequency of maintenance of the (fuel) filters can be reduced as a whole.

In addition, as described above, as the paper filters of the pilot fuel filters 141, filters having a filtration efficiency higher than that of the switching wash filters of the main fuel filters 131 are used. Pilot fuel is supplied to the pilot fuel supply rail pipe (common rail pipe) 47, and supplied to the pilot fuel injection valves 82 at high pressure to be injected in a small amount to the combustion chambers 110. Thus, the pilot fuel generally passes through pipes having small diameters. Thus, in a conventional configuration, pipes for supplying pilot fuel, clogging especially easily occurs as compared to pipes for supplying main fuel. In this regard, in this embodiment, the paper filters of the pilot fuel filters 141 have a filtration efficiency higher than that of the switching wash filters of the main fuel filters 131. Thus, clogging of the pilot fuel can be effectively prevented or reduced, and gaseous fuel can be ignited with reliability. The filtration efficiency of the pilot fuel filters 141 may be equal to or lower than that of the main fuel filters 131.

As the filtration efficiency of a filter increases, the costs for the filter increases in general. In this embodiment, the pilot fuel filters 141 having high filtration efficiency are disposed in the pilot fuel supply path 122 that is a path substantially independent of the main fuel supply path 121. Thus, a flow of fuel oil from the main fuel supply path 121 into the pilot fuel filters 141 can be prevented or reduced, and thus, the frequency of replacement of the pilot fuel filters 141 can be reduced. In addition, clogging is less likely to occur in the expensive pilot fuel filters 141, costs for maintenance can be reduced.

As described above, the engine 100 according to this embodiment is operable in the premixed combustion system in which gaseous fuel mixed with air is caused to flow into the combustion chambers and the diffusion combustion system that injects liquid fuel into the combustion chambers for combustion. The engine 100 includes the main fuel injection valves 79, the pilot fuel injection valves 82, the liquid fuel tank 33, the main fuel supply path 121, the pilot fuel supply path 122, the pilot fuel filters 141, the pilot fuel high-pressure pump 56, the pilot fuel tank 171, and the pilot fuel supply pump 173. The main fuel injection valves 79 supply liquid fuel to the combustion chambers during combustion in the diffusion combustion system. The pilot fuel injection valves 82 supply liquid fuel as pilot fuel in order to ignite gaseous fuel during combustion in the premixed combustion system. The liquid fuel tank 33 stores liquid fuel. The main fuel supply path 121 supplies liquid fuel stored in the liquid fuel tank 33 to the main fuel injection valves 79. The pilot fuel supply path 122 supplies liquid fuel stored in the liquid fuel tank 33 as pilot fuel to the pilot fuel injection valves 82. The pilot fuel filters 141 are disposed in an intermediate portion of the pilot fuel supply path 122. The pilot fuel high-pressure pump 56 is disposed in an intermediate portion of the pilot fuel supply path 122, and sends, to the pilot fuel injection valves 82, pilot fuel that has passed through the pilot fuel filters 141. The pilot fuel tank 171 is disposed in an intermediate portion of the pilot fuel supply path 122, and stores pilot fuel sent from the pilot fuel high-pressure pump 56 and not injected by the pilot fuel injection valves 82. The pilot fuel supply pump 173 is disposed in an intermediate portion of the pilot fuel supply path 122, and sends pilot fuel stored in the pilot fuel tank 171 to (the automatic backwash filter 174 and) the pilot fuel filters 141.

Accordingly, uninjected pilot fuel does not return to the liquid fuel tank 33 and is supplied to the pilot fuel injection valves 82 again. Thus, pilot fuel purified by the pilot fuel filters 141 is not easily mixed with liquid fuel in the liquid fuel tank 33. Consequently, even with a low cleanliness of liquid fuel stored in the liquid fuel tank 33, the maintenance frequency of the pilot fuel filters 141 can be reduced.

The engine 100 according to this embodiment also includes the fuel purification path 123. The fuel purification path 123 is a path for circulation through the automatic backwash filter 174 for purifying pilot fuel and the pilot fuel tank 171.

Accordingly, pilot fuel is purified by the automatic backwash filter 174 in addition to the pilot fuel filters 141, and thus, the maintenance frequency of the pilot fuel filters 141 can be further reduced.

In the engine 100 according to this embodiment, the pilot fuel supply path 122 and the fuel purification path partially overlap each other.

Accordingly, since the two paths overlap, the length of fuel pipes can be reduced. In addition, a pressure loss occurring when fuel flows through the fuel pipes can be reduced.

In the engine 100 according to this embodiment, the automatic backwash filter 174 has a filtration efficiency lower than that of the pilot fuel filters 141.

Accordingly, the pilot fuel filters 141 only need to remove foreign substances not removed by the automatic backwash filter 174, and thus, the maintenance frequency of the pilot fuel filters 141 can be further reduced.

The engine 100 according to this embodiment further includes the pilot fuel supply rail pipe 47 and the main fuel filters 131. The pilot fuel supply rail pipe 47 is disposed in an intermediate portion of the pilot fuel supply path 122, and supplies pilot fuel to the pilot fuel injection valves 82 at a pressure higher than that of liquid fuel supplied to the main fuel injection valves 79. The main fuel filters 131 are disposed in an intermediate portion of the main fuel supply path 121. The pilot fuel filters 141 have a filtration efficiency higher than that of the main fuel filters 131.

Accordingly, clogging with pilot fuel injected at high pressure can be more efficiently prevented or reduced, and gaseous fuel can be ignited with reliability.

Next, the following describes a variation of the embodiment with reference to FIG. 11. FIG. 11 is a schematic view for describing a fuel supply path that supplies fuel oil to the engine body 21 according to a variation. In a manner similar to the embodiment, the engine 100 according to the variation includes a pilot fuel tank 171, and supplies at least a part of fuel oil returned to the pilot fuel tank 171 to the pilot fuel injection valves 82 again without returning the oil to the liquid fuel tank 33.

In this variation, second pilot fuel filters 142 that are switching wash filters are disposed instead of the automatic backwash filter 174. The second pilot fuel filters 142 may have any filtration efficiency, but the filtration efficiency of the second pilot fuel filters 142 is preferably lower than that of the pilot fuel filters 141. Common fuel filters 190 are disposed on a path that sends fuel from the liquid fuel tank 33 and a path shared by the main fuel supply path 121 and the pilot fuel supply path 122 (a path before being branched). The common fuel filters 190 may have any filtration efficiency, but the filtration efficiency of the common fuel filters 190 is preferably lower than that of the main fuel filters 131. As described above, a plurality of types of filters having different filtration efficiencies are disposed so that the maintenance frequency of each filter can be reduced. The number of filters disposed in the main fuel supply path 121 and the number of filters disposed in the pilot fuel supply path 122 are not limited to the example described above, and may be changed.

In this embodiment, the pilot pressure retention valve 185 is disposed in parallel with the pilot fuel supply pump 173, and no fuel purification path 123 is formed. The fuel purification path 123 may be omitted in this manner.

The foregoing description is directed to the preferred embodiment of the present invention, and the configuration described above may be changed, for example, as follows.

In the embodiment described above, the engine 100 is used as a driving source of a propulsive and power generating mechanism of a ship, but this is not restrictive, and the engine 100 may be used only for propulsion of the ship and may be used only for power generation in the ship. The engine body 21 is not limited to ships, and may be placed in other moving objects or buildings.

The main fuel filters 131, the pilot fuel filters 141, and the automatic backwash filter 174 may have different configurations from those described above as long as foreign substances or the like contained in fuel can be removed. That is, the main fuel filters 131 and the pilot fuel filters 141 may be made of paper, metal, or nylon. The automatic backwash filter 174 may be replaced by a paper filter, for example.

In the main fuel supply path 121, the main fuel pump 161 for pumping liquid fuel (fuel oil) may be disposed downstream of the main fuel filters 131 or upstream of the main fuel filters 131.

In the embodiment described above, the pilot fuel high-pressure pump 56 is disposed downstream of the pilot fuel filters 141, but this is not restrictive. For example, in a case where a low fuel cleanliness is required for the pilot fuel high-pressure pump 56, the pilot fuel high-pressure pump 56 may be disposed upstream of the pilot fuel filters 141.

In the embodiment described above, the fuel purification path 123 overlaps the main fuel supply path 121, but may not overlap the main fuel supply path 121.

REFERENCE SIGNS LIST 21 engine body
79 main fuel injection valve
82 pilot fuel injection valve
100 engine
121 main fuel supply path
122 pilot fuel supply path
123 fuel purification path
131 main fuel filter
141 pilot fuel filter
171 pilot fuel tank
174 automatic backwash filter (purification filter)

What is claimed is:

1. An engine operable in a premixed combustion system in which gaseous fuel is mixed with air is caused to flow into a combustion chamber the engine comprising:
   a pilot fuel injection valve that supplies liquid fuel as pilot fuel to the combustion chamber in order to ignite gaseous fuel during combustion in the premixed combustion system;
   a liquid fuel tank that stores liquid fuel;
   a pilot fuel supply path that supplies liquid fuel stored in the liquid fuel tank as pilot fuel to the pilot fuel injection valve; and
   at least two pilot fuel filters disposed in an intermediate portion of the pilot fuel supply path.

2. The engine according to claim 1, further comprising:
   a pilot fuel high-pressure pump disposed in an intermediate portion of the pilot fuel supply path and configured to send pilot fuel that has passed through the pilot fuel filter to the pilot fuel injection valve; and
   a pilot fuel supply pump disposed in an intermediate portion of the pilot fuel supply path.

3. The engine according to claim 1, further comprising:
   a pilot fuel supply common rail pipe disposed in an intermediate portion of the pilot fuel supply path and configured to supply pilot fuel to the pilot fuel injection valve.

* * * * *